March 12, 1940. A. E. LANGE 2,193,136
SIGNAL ACTUATING DEVICE
Filed June 5, 1937 3 Sheets-Sheet 2
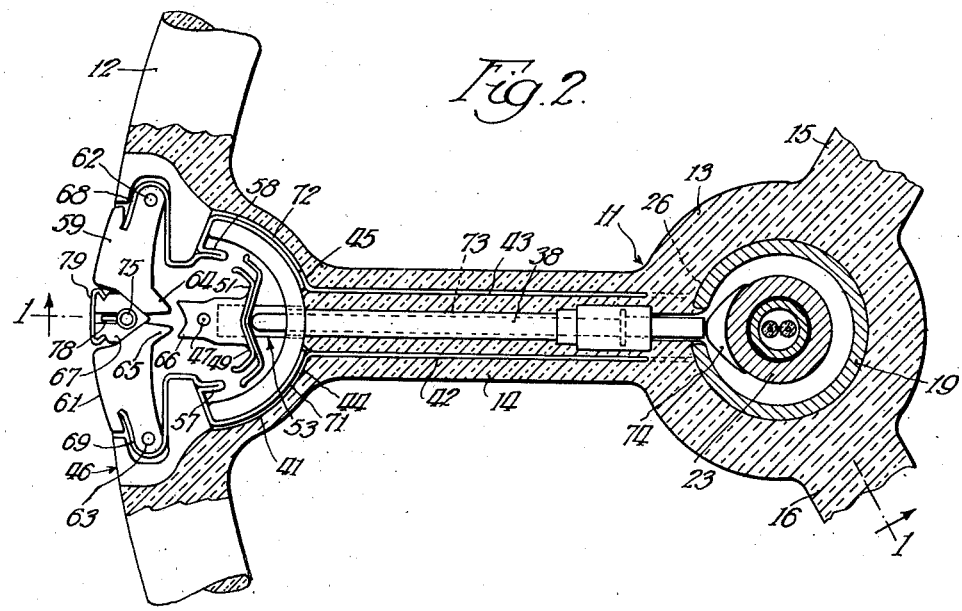
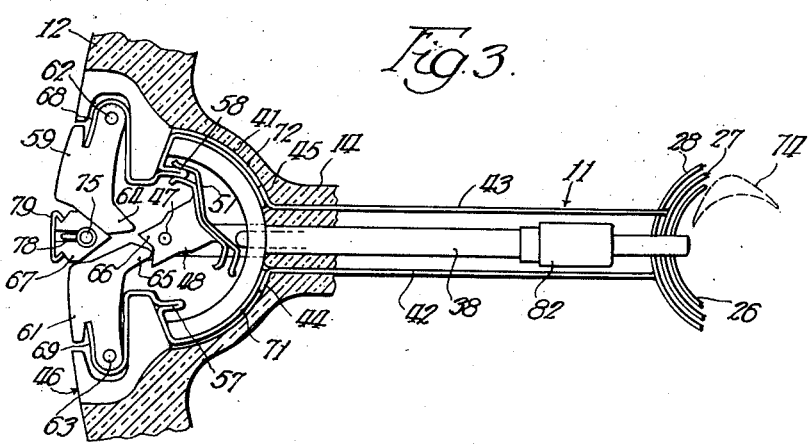
Inventor
Arthur E. Lange
By Hill + Hill Attys.
Witness
V. Siljander

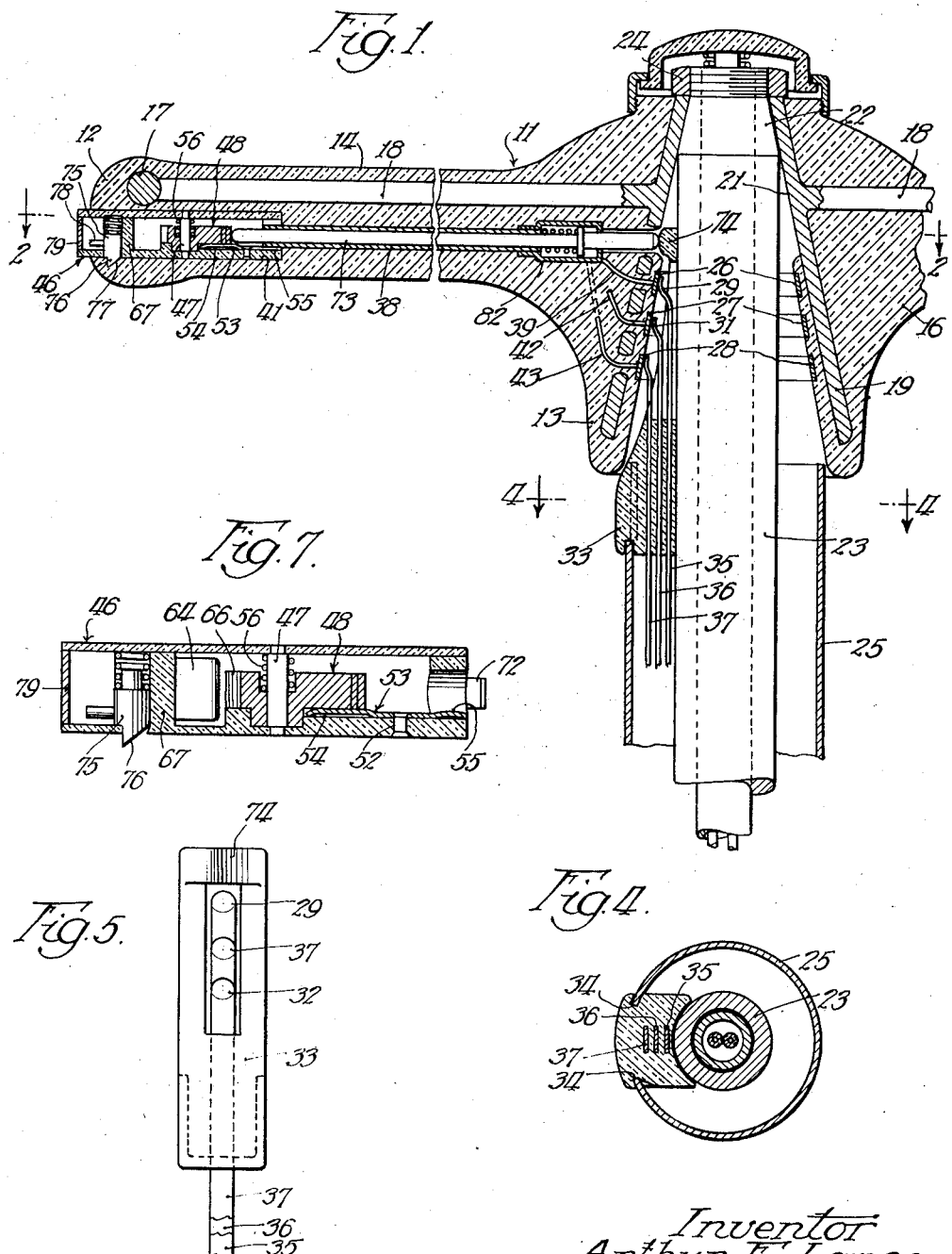

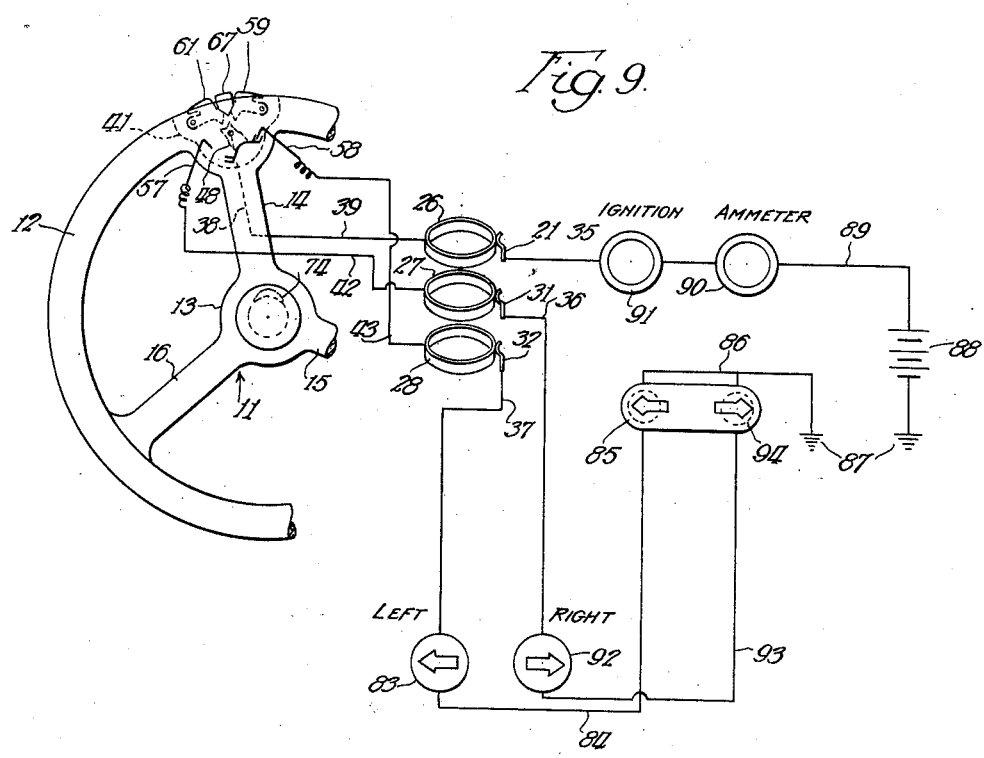

Patented Mar. 12, 1940

2,193,136

UNITED STATES PATENT OFFICE 2,193,136

SIGNAL ACTUATING DEVICE

Arthur E. Lange, Chicago, Ill.

Application June 5, 1937, Serial No. 146,572

6 Claims. (Cl. 200—59)

This invention relates to signal actuating devices, and is particularly well adapted for use in conjunction with motor vehicles such, for example, as automobiles, trucks, trailers and the like.

One object of the present invention is to provide a novel construction and arrangement for indicating directional movements of a vehicle.

Another object of the invention is to provide a novel signal actuating device positioned in a motor vehicle in a manner to be conveniently accessible to the driver or operator thereof.

Another object of the invention is to provide a novel signal actuating device mounted in the steering wheel and associated parts of a motor vehicle.

Another object of the invention is to provide novel manually actuated means for setting a signal to indicate directional movements of a vehicle, and to provide novel means, automatically actuated and controlled by the normal operation of the vehicle, for clearing the signal.

A further object of the invention is to provide a novel signalling device wherein the actuating means therefor are positioned in the rim of a steering wheel of a motor vehicle in a manner to be conveniently and readily removed therefrom without disturbing other portions of the device.

A still further object of the invention is to improve devices of the character described in sundry details hereinafter referred to and particularly pointed out in the appended claims.

One embodiment of the present invention is shown for illustrative purposes in the accompanying drawings, in which:

Fig. 1 is a fragmentary vertical sectional view through a portion of a steering wheel and tubular column associated therewith, taken substantially as indicated by the line 1—1 of Fig. 2, and illustrating the application of my improved signal actuating device in relation thereto.

Fig. 2 is a fragmentary plan sectional view of the structure illustrated in Fig. 1, and taken substantially as indicated by the line 2—2 thereof.

Fig. 3 is a fragmentary view similar to Fig. 2, and illustrating certain of the elements in changed position.

Fig. 4 is a transverse sectional plan view, taken substantially as indicated by the line 4—4 of Fig. 1.

Fig. 5 is an elevational view of a portion of the structure illustrated in Figs. 1, 2, and 4.

Fig. 6 is a plan view of a switch housing and associated parts forming a part of the present invention, and having a portion thereof broken away to better illustrate certain structures associated therewith.

Fig. 7 is an enlarged sectional elevational view, taken substantially as indicated by the line 7—7 of Fig. 6.

Fig. 8 is a perspective view of a clip or cover member operatively related to a portion of the switch housing; and Fig. 9 is a diagrammatic view of my improved signal actuating device shown in conjunction with an electrical circuit for operating signals to indicate directional movements of a vehicle.

As illustrated in Figs. 1 to 8, inclusive of the drawings, the present invention is shown in conjunction with a vehicle steering wheel indicated, as a whole, by the numeral 11, and comprising a rim 12, hub 13, spokes 14, 15, and 16, all formed, preferably, of insulating materials, such, for example, as hard rubber or the like molded around metallic reinforcing members 17 and 18 positioned in the rim 12 and spokes, respectively, the reinforcing members 18 of the spokes being connected at their inner ends to a sleeve 19 having an elongated tapered opening 21 formed therein adapted to receive the tapered end portion 22 of a steering post 23, and to be secured thereto by a nut 24, as clearly illustrated in Fig. 1.

Surrounding the post 23 in the customary manner and in spaced relation thereto is a tubular column 25 by which the steering post is concealed and supported in the body of the vehicle.

Mounted in the hub 13, preferably, on the inner side thereof and in a manner to rotate therewith, are a plurality of rings 26, 27, and 28 formed of current conducting material and adapted to be engaged, respectively, by a plurality of resilient brushes 29, 31, and 32 rigidly mounted in laterally spaced relation in a block 33 of insulating material positioned within the tubular column 25, and secured thereto by means of groove and tongue-like connections 34 (Fig. 4), the said brushes having conductors 35, 36 and 37, respectively, extending downwardly from the block 33 and through the tubular column 25.

Mounted in the insulating material of the spoke 14, for example, is a tubular guide member 38 shown, in the present instance, as electrically connected by means of a conductor 39 to the ring 26, the opposite or outer end of the guide member 38 being adapted to extend into a recess 41 formed in the rim 12 adjacent the outer end portion of the spoke 14.

Mounted also in the spoke 14 in spaced relation to the guide member 38 and, preferably, at opposite sides thereof, are a pair of conductors 42 and 43 (Figs. 2 and 3) connected adjacent their respective inner ends with the rings 27 and 28, respectively, the opposite or outer ends of the conductors 42 and 43 being adapted to extend into the recess 41, as indicated at 44 and 45, respectively.

Mounted in the recess 41 and formed, preferably, of insulating material, is a switch housing indicated, as a whole, by the numeral 46, and pivotally mounted intermediate its ends on a pivot pin 47 positioned in said housing is a movable contact member indicated, as a whole, by the numeral 48, the said contact member being provided adjacent one of its ends with a pair of oppositely disposed relatively inclined contact portions 49 and 51.

Positioned also in the housing 46, and secured thereto by means of a rivet 52 (Fig. 7), is an electrical conductor or resilient finger indicated, as a whole, by the numeral 53 having one of its end portions 54 operatively related to the movable contact member 48, and its opposite end 55 adapted to engage the portion of the guide member 38 extending into the recess 41 as shown in Fig. 1, the member 48 being retained in frictional engagement with the end portion 54 of the conductor 53 by means of a spring 56 surrounding the pivot pin 47, as clearly illustrated in Fig. 7.

Mounted also in the housing 46 are a pair of relatively fixed contacts 57 and 58 adapted to be engaged, respectively, by the contact portions 49 and 51 of the movable contact member 48 when said member is moved about its pivot 47 in one direction or another, and for moving the contact 48 in a manner to establish contact with one or the other of the relatively fixed contacts 57 or 58, a pair of push buttons or lever members 59 and 61 are mounted in the housing 46, and shown, in the present instance, as pivotally connected thereto by means of pins 62 and 63, respectively, the free end portions, 64 and 65 of the members 59 and 61, respectively, being adapted to engage the end portion 66 of the member 48, shown as having a broad V-shaped recess therein as illustrated in Fig. 3, to rotate the member 48 in one direction or another in a manner to selectively engage one or another of the relatively fixed contacts 57 and 58, the said lever members 59 and 61 being normally retained against a stop portion 67 of the housing 46 and out of engagement with the end 66 of the member 48 by means of resilient spring members 68 and 69, respectively, shown, in the present instance, as continuations of the material or strips from which the relatively fixed contacts 57 and 58 are formed.

For establishing electrical connections between the relatively fixed contacts 57 and 58 with the conductors 42 and 43, respectively, the contacts 57 and 58 are shown, in the present instance, as provided with resilient portions or fingers 71 and 72 (Fig. 7) extending outwardly from the housing 46 to the outer side thereof in a manner to engage the end portions 44 and 45, respectively, of the conductors 42 and 43, as clearly illustrated in Figs. 2 and 3 when the housing is positioned within the recess 41.

For restoring the movable contact member 48 to its neutral or inoperative position after contact has been made with one or another of the fixed contacts 57 or 58, a rod 73 is slidably mounted in the guide member 38 in a manner to position the outer end of the rod within the housing 46, the opposite or inner end of the rod 73 being adapted to be engaged by a cam portion or projection 74 shown, in the present instance, as formed on an upwardly extending portion of the block 33, for moving the outer end of the rod 73 into engagement with one or another of the relatively inclined contact portions 49 or 51 of the member 48 when the steering wheel 11 is moved to a position for directing the vehicle in a straightaway direction, and the cam portion 73 and member 48 are in the positions shown in Fig. 3, in a manner to move the member 48 to the position shown in Fig. 2.

For securing the housing 46 against accidental displacement with respect to the recess 41, a spring actuated latch member 75 is slidably mounted in the stop portion 67 of the housing 46, and is provided with a downwardly extending portion 76 adapted to engage a recess 77 formed in the rim 12, as clearly illustrated in Fig. 1, the latch member 75 being provided with a laterally extending lifting pin 78 by which the projection 76 may be withdrawn from the recess 77 when it is desired to remove the housing 46 from the recess 41. For protecting the lifting pin 78 against unauthorized movement or tampering, a clip or cover member 79 is secured to the stop portion 67 in a manner to cover and conceal the pin 78, as clearly illustrated in Figs. 1, 2, 3, and 7.

By reference to Fig. 2, it will be noted that the relative positions of the rod 73 and cam 74 are such as to position the movable contact member 48 in its neutral position, a condition prevailing when the position of the steering wheel is such as to direct a vehicle in a straight line or forward direction.

It is well known that in usual practice and construction of steering devices, a small amount of play or lost motion is provided in the steering wheel, which permits slight movement of the wheel either to the right or left without affecting the position of the supporting or ground wheels of the vehicle. This slight rotation of the steering wheel in either direction serves to position the rod 73 out of alignment with the cam 74, as illustrated in Figs. 3 and 9 of the drawings, at which time a compression spring 81, (Fig. 1), operating in an enlarged portion 82 of the guide member 38, will act to move the rod 73 in an inwardly direction, as illustrated in Fig. 3.

It is also a well-known fact that the driver of a vehicle, in contemplating a turn to the right or left, instinctively, will shift the wheel slightly in the direction he intends to make a turn to take up the slack or lost motion, and when the steering wheel is so shifted, and the rod 73 is in the position shown in Fig. 3, one or the other of the buttons or lever members 59 or 61 may be manipulated, as, for example, the member 61, as shown in Figs. 3 and 9, to position the movable contact member 48 in engagement with the relatively fixed contact 58 to indicate a "left" turn.

By reference to Fig. 9, it will be noted that when the movable contact member 48 is in engagement with the relatively fixed contact 58, a circuit may be traced from the contact 58 through the conductor 43, ring 28, brush 32, and conductor 37, through a lamp 83, which may be positioned at the rear of the vehicle, for example, to indicate a "left" turn, and thence through a conductor 84 to a pilot lamp 85, which may be mounted on the instrument board or other convenient place within a vehicle to indicate to the operator thereof that the signal lights are operating, and from the lamp 85, the circuit may be followed through a conductor 86, ground 87, battery 88, conductor 89, ammeter 90, ignition switch 91, conductor 35, brush 21, ring 26, conductor 39, tubular guide member 38 and movable contact member 48, thereby actuating a signal through the lamp 83 to indicate a "left" turn.

In a similar manner, when the button or lever member 59 is actuated to position the movable contact member 48 in engagement with the relatively fixed contact 57 to indicate a "right" turn, a circuit may be traced from the fixed contact 57 through the conductor 42, ring 27, brush 31, conductor 36, right-turn signal lamp 92, conductor 93, pilot light 94, ground 87 to battery 88 and thence through the connections and elements above mentioned with reference to the right-turn circuit including the ring 26, back to the movable contact member 48, the purpose of carrying both the signal circuits through the ignition switch 91 being to prevent operation of the signal device mechanism and lamps when the ignition switch is in "Off" position.

After completing a turn of the vehicle in the indicated direction, the steering wheel 11 will be brought back to the straightaway position, and in so doing, the inner end of the rod 73 will engage the cam 74 in a manner to move the rod in an outwardly direction to disconnect the movable contact member 48 from one or the other of the fixed contacts 57 or 58 and to the position shown in Fig. 2, thereby "clearing" the signal until it is next desired to indicate a turn of the vehicle.

It will be observed from the foregoing description that the present invention provides a novel construction and arrangement in a signal device, which is conveniently accessible to the driver or operator of the vehicle, and whereby direction signals may be selectively operated to indicate either a right or left turn of the vehicle, and wherein the signal may be "cleared" and the actuating mechanism restored to neutral position automatically by the normal operation and handling of the vehicle. It will also be observed that the present invention provides a novel construction and arrangement whereby the actuating means positioned in the rim of a steering wheel may be conveniently and readily removed therefrom without disturbing other portions of the device.

Obviously, the present invention is not limited to the precise construction and arrangement shown and described as the same may be variously modified. Moreover, all the features of the invention need not be used conjointly as the same may be used to advantage in variously different combinations and subcombinations.

What I claim as new and desire to secure by Letters Patent is:

1. In a signal actuating device, the combination with the steering wheel of a motor vehicle and a relatively fixed tubular column associated therewith, of a movable contact member pivotally mounted on said wheel adjacent the rim thereof, a pair of relatively fixed contacts adapted to be engaged by said movable member, a pair of push buttons adjacent the rim of said wheel and operatively related, selectively, to said movable contact member for selectively moving said member into engagement with one or the other of said relatively fixed contacts, and a single cam member mounted on said column and operatively related to said movable contact member for moving said member out of engagement with said relatively fixed contacts.

2. In a signal actuating device, the combination with the steering wheel of a motor vehicle and a relatively fixed column associated therewith, said wheel comprising a rim having a recess therein, a hub, and spokes connecting said rim and hub, a plurality of conductors in one of said spokes and having end portions extending into said recess, a switch housing adapted to be positioned in said recess, a plurality of electrical contacts mounted in said housing, resilient fingers operatively related, respectively, to said contacts and engageable with the ends of said conductors when the housing is positioned in said recess, manually operated means for connecting two of said contacts, means engageable with said manually operated means and operatively related to said wheel and column, respectively, for disconnecting the contacts, and means for securing said housing in said recess.

3. In a signal actuating device, the combination with the steering wheel of a motor vehicle and a relatively fixed column associated therewith, said wheel comprising a rim and spokes and having a recess formed in said rim adjacent the outer end of one of said spokes, a pair of relatively fixed electrical contacts mounted in said recess, a movable contact member having relatively inclined portions adjacent one of its ends and pivotally mounted intermediate its ends in said recess, a pair of pushbuttons engageable, selectively, with the opposite end of said movable member for selectively moving said contact member into engagement with one or the other of said fixed contacts, a rod slidably mounted in said spoke and having one of its ends extending into said recess, and a cam mounted on said column and engageable with the opposite end of said rod for moving the first mentioned end thereof into engagement with one or the other of said inclined portions to disengage said movable contact member from engagement with one or the other of said relatively fixed contacts.

4. In a signal actuating device, the combination with the steering wheel of a motor vehicle, said wheel comprising a rim portion and spokes connected thereto, a movable contact member pivotally mounted in said rim portion adjacent the outer end of one of said spokes, a tubular guide member forming an electrical conductor positioned in said spoke and electrically connected to said contact member, a pair of relatively fixed electrical contacts mounted in said rim adapted to be engaged, selectively, by said movable member, manually actuated means operatively related to said pivoted contact member for moving the pivoted member into engagement with one or the other of said relatively fixed contacts, a rod slidably mounted in said guide member and having one of is ends engageable with said movable contact, and means for moving said rod to move the pivoted contact member out of engagement with said relatively fixed contacts.

5. In a signal actuating device, the combination with the steering wheel of a motor vehicle and a relatively fixed column associated therewith, said wheel comprising a rim having a recess therein, and spokes operatively related to said rim, a plurality of laterally spaced conductors in one of said spokes and having one of their respective end portions extending into said recess, a switch housing adapted to be positioned in said recess, a movable contact member and a pair of relatively fixed electrical contacts mounted in said housing, resilient fingers operatively related, respectively, to said movable member and said contacts and engageable, respectively, with the end portions of said conductors when the housing is positioned in said recess, manually operated means pivotally mounted in said housing and engageable with said movable contact member for selectively moving said contact member into engagement with one or the other of said fixed contacts, means operatively related to said wheel and column, respectively, for disconnecting the movable contact member from said relatively fixed contacts, and means mounted in said housing and operatively related to said wheel for removably securing the housing in said recess.

6. In a signal actuating device, the combination with a steering wheel of a motor vehicle and a relatively fixed column associated therewith, said wheel comprising a rim and spokes connected thereto and having a recess formed in said rim adjacent the outer end of one of said spokes, a tubular guide member in said one of the spokes and having its outer end portion extending into said recess, a pair of conductors mounted in said spoke in spaced relation to said guide member and having their respective outer end portions extending into said recess, a switch housing removably mounted in said recess, a movable contact member pivotally mounted intermediate its ends in said housing, a pair of oppositely disposed relatively inclined contact portions on one end of said movable contact member, a pair of relatively fixed contacts mounted in said housing, resilient fingers operatively related, respectively, to said movable contact member and fixed contacts and engageable with said guide member and conductors, respectively, for electrically connecting said movable contact member and fixed contacts thereto, a pair of manually actuated lever members pivotally mounted in said housing and engageable with the opposite end of said movable contact member for moving one or the other contact portions thereof into engagement with one or the other of said fixed contacts, a rod longitudinally movable in said guide member and engageable at one of its ends with the relatively inclined portions of said movable contact member for moving said contact member out of engagement with said fixed contacts, a cam on said column for moving said rod, and means for removably securing said housing in said recess.

ARTHUR E. LANGE.